United States Patent Office 3,749,571
Patented July 31, 1973

3,749,571
COLD-PRESSED COMPOSITIONS
Donald Stibbs, Dorking, Clifford Gordon Brown, Fetcham, and Raymond Thompson, Esher, England, assignors to the United States Borax & Chemical Corporation, Los Angeles, Calif.
No Drawing. Filed Oct. 4, 1971, Ser. No. 186,503
Claims priority, application Great Britain, Oct. 7, 1970, 47,744/70, 47,745/70, 47,746/70
Int. Cl. B22f 1/00
U.S. Cl. 75—204
14 Claims

ABSTRACT OF THE DISCLOSURE

Hard, shaped bodies are made by sintering a cold-pressed compact of a boron-carbon compound which contains a densification aid selected from silicon, aluminum, magnesium, metal borides, and mixtures thereof.

---

This invention relates to the production of hard, shaped bodies made from compounds containing boron and carbon, in particular made from boron carbide ($B_4C$).

The usual method of shaping boron carbide powder to form hard shaped bodies is by hot pressing, which is a comparatively expensive process. An alternative process of cold pressing and sintering can be used for forming shaped bodies of some ceramic powders, but is not a satisfactory alternative to hot pressing for the shaping of boron carbide because the resultant shaped bodies are not as strong or hard as those formed by hot pressing of boron carbide. We have now found a method for making boron carbide articles by cold pressing and sintering such that the articles are of a strength and hardness comparable to that of hot pressed boron carbide articles. For example, we have found it possible to cold press and sinter boron carbide such that the resultant article has a density in excess of 99% the theoretical density.

According to the present invention there is provided a method of producing a hard shaped article which comprises sintering a cold-pressed compact of a powder of a compound of boron and carbon, which compact contains, as a densification aid, silicon, aluminum, magnesium, or a boride of a metal, or mixtures of two or more of these materials. By way of example of a mixture, the aluminum or the metal boride can be combined with silicon. A combination of the metal boride and aluminum, with or without silicon, can also be used with good effect as a densification aid. The preferred metal borides are borides of metals lighter than zirconium, especially titanium diboride and chromium diboride.

The densification aid may be introduced into cold-pressed compacts of the powdered boron-carbon compound before these compacts are sintered. It can be combined with the powdered boron-carbon compound to form a mixture which is cold pressed and then sintered, or it may be impregnated into cold pressed compacts of the boron-carbon compound, which impregnated compacts are then sintered. These two methods of introducing the densification aid are described in more detail below.

In the first method of introducing the densification aid, the rough mixture containing preferably 5% to 10% by weight of the densification aid is ball milled to effect intimate admixture and to further reduce the particle size and the mixture is then cold pressed. The cold-pressing will usually be carried out at ambient temperature and at a pressure of the order of about 20 British tons per sq. inch. (3150 kg./sq. cm.) to the desired shape, e.g. a disc or plate. The shaped compact is then sintered at a temperature of at least about 2000° C. and preferably at about 2100° C.

Alternatively the densification aid, when it has a melting point below 2200° C., can be introduced by impregnating a cold-pressed boron carbide compact. The compact may have been produced by cold-pressing at the above-mentioned temperature and pressure. The densification aid can be introduced into the compact while in the molten state or vapor phase. For example, it can be introduced in the molten state by immersing a cold pressed boron carbide compact in the molten material, or by dipping the cold pressed compact in molten material so that the densification aid rises by capillary action, or by pouring the molten densification aid over the cold pressed compact. For example, impregnation with molten silicon can take place at a temperature of at least about 2000° C. and preferably about 2100° C. Alternatively the silicon may be introduced by vacuum deposition of vaporized silicon, but it is preferred to impregnate the compacts with liquid (molten) silicon. The compacts are preferably impregnated with sufficient silicon to provide about 5 to 10% by weight of silicon. The silicon serves as a densification aid, so that on subsequently being heated to about 2000° C. or more the compacts sinter and densify (as is demonstrated by shrinkage) to achieve a density of 99% or more of the theoretical density.

The cold-pressing may take place at any of the usual temperatures and pressures for cold-pressing, which will generally be within the ranges of ambient temperature to about 40° C. and a pressure of about 15–30 British tons/square inch (2350–4700 kg./sq. cm.). The preferred conditions are about ambient temperature and a pressure of 20–25 tons/square inch (3150–3925 kg./sq. cm.).

Generally the sintering is carried out at a temperature of about 1900°–2300° C., most usually 2000°–2300° C. and preferably 2150°–2250° C.

The quantity of densification aid in the mixture will usually be in the range of about 3–15% by weight, most preferably about 5–10%.

Cold-pressed and sintered articles made by the method of the present invention are not necessarily of the same strength and impact resistance as hot-pressed boron carbide articles, but they have a strength and impact resistance of the same order and are generally comparable. Thus, articles made by the process of this invention may be used in place of hot-pressed articles, e.g. as shot-blast nozzles, ceramic armour or in wear-resistant applications such as bearing surfaces.

The following examples illustrate the invention.

EXAMPLE I

Boron carbide powder having a particle size below 350 British standard mesh (below 45 microns) is mixed with aluminum powder and the mixture is then ball-milled in a vibrator to effect intimate mixing and to reduce the particle size to below 6 microns. A binder, e.g. camphor in ether or polyethylene glycol in acetone, is then stirred into the mixture to provide a temporary binder during cold pressing, and the mixture is then pressed at a pressure of about 20 British tons/square inch (3150 kg./sq. cm.) into circular discs having a thickness of about 0.5 inch (1.2 cm.) and a diameter of about 3 inches (7.5 cm.). The cold pressed shapes are then heated for about 1 hour to a temperature below the melting point of aluminum and held at this temperature in an inert (argon) atmosphere and then the compacts are sintered at a temperature of about 2100° C. which is sufficient to achieve rapid densification of the compacts without substantial loss of aluminum as vapor.

When a mixture comprising 90% boron carbide and 10% aluminum is cold pressed and sintered in this way, the dense compacts formed have a density of 99.2% of the theoretical maximum density, indicating that they are very hard.

EXAMPLES II AND III

Samples to prove the effectiveness of this invention in making cold-pressed boron carbide plates of high density were made as follows. The boron carbide powder of Example I was mixed with silicon powder and the mixture was ball-milled in a vibrator to effect intimate mixing and to reduce the particle size of the mixture further, e.g. to about 6 microns. A temporary binder, as specified in Example I, was added, and then the mixture was pressed into circular plates 0.25 inch (0.6 cm.) thick and 3 inches (7.5 cm.) in diameter at a pressure of 20 British tons/ square inch (3150 kg./sq. cm.). The cold-pressed plates were then heated for about 1 hour to attain a temperature of about 500° C. in an inert atmosphere to evaporate all the binder and then were sintered at about 2100° C. for a period of 13 minutes. A shorter sinter period, about 5 minutes, was used for pellets of the boron carbide mixture, about 0.5 inch in diameter. Two batches were prepared by this procedure, one containing 90% boron carbide and 10% silicon (Example II), and the other containing 95% boron carbide and 5% silicon (Example III). Plates from both mixtures exhibited shrinkage after sintering, demonstrating that densification had occurred. The density of the plates containing 10% silicon was 99.2% of the theoretical maximum density, while the density of the plates containing 5% silicon was calculated to be 100% of the theoretical maximum, indicating that plates of extremely high density had been made.

EXAMPLES IV-VIII

Seventy-five grams of a boron carbide powder of particle diameter less than 45 microns was milled with 7.5% by weight of, respectively, powders of aluminum, magnesium, silicon, titanium diboride and chromium diboride. One gram of a binder as specified in Example I was added and the mixture was pressed into discs as described in Example II. The discs were heated to remove the binder and sintered as described in Example II, yielding extremely dense bodies.

EXAMPLE IX

This example illustrates introduction of the densification aid by impregnating the already cold-pressed compact.

A cold-pressed compact of boron carbide 3 inches (7.5 cm.) in diameter by ¼ inch (0.6 cm.) thick was made under the cold-pressing conditions of Example II. Three grams of chips of metallic silicon were placed on the compact which was heated in argon to 2100° C. A highly dense, sintered silicon-containing body was obtained.

Various changes and modifications of the invention can be made, and to the extent that such variations incorporate the spirit of this invention, they are intended to be included within the scope of the appended claims.

What is claimed is:

1. The method of producing a highly dense, hard shaped article which comprises forming a cold-pressed compact of a compound of boron and carbon and about 3 to 15% by weight of a densificaiton aid selected from silicon, aluminum, magnesium, titanium diboride, chromium diboride, and mixtures thereof, and sintering said cold-pressed compact at a temperature of about 1900°–2300° C.

2. The method according to claim 1 wherein said densification aid is mixed with the powdered boron-carbon compound prior to cold-pressing the mixture.

3. The method according to claim 1 wherein said compact has been impregnated with said densification aid.

4. The method according to claim 3 wherein the impregnation is effected by contacting the cold-pressed compact with a vapor or melt of said densification aid.

5. The method according to claim 1 wherein said compound of boron and carbon is boron carbide.

6. The method according to claim 1 wherein said densification aid is aluminum.

7. The method according to claim 1 wherein said densification aid represents about 5 to 10% by weight of said compact.

8. The method according to claim 1 wherein said densification aid is titanium diboride.

9. A cold-pressed compact of a compound of boron and carbon containing about 3 to 15% by weight of a densification aid selected from the group consisting of titanium diboride and chromium diboride.

10. A compact according to claim 9 wherein said densification aid represents about 5 to 10% by weight of said compact.

11. A compact according to claim 9 wherein said compound of boron and carbon is boron carbide.

12. The method according to claim 1 in which said densification aid is silicon.

13. The method according to claim 1 in which said cold-pressed compact is heated in an inert atmosphere at about 500° C. prior to sintering.

14. The method according to claim 1 in which said sintering is at a temperature of about 2150° to 2250° C.

References Cited

UNITED STATES PATENTS

| | | | |
|---|---|---|---|
| 3,178,807 | 4/1965 | Bergmann | 75—204 X |
| 2,746,133 | 5/1956 | Lowe | 75—204 X |
| 3,386,812 | 6/1968 | Sheinberg | 75—204 X |
| 3,306,741 | 2/1967 | Lallemant | 75—204 |

CARL D. QUARFORTH, Primary Examiner

R. E. SCHAFER, Assistant Examiner

U.S. Cl. X.R.

29—182.5; 106—43, 55, 66